(12) United States Patent
Massi

(10) Patent No.: US 11,827,174 B2
(45) Date of Patent: Nov. 28, 2023

(54) APPARATUS FOR COVERING AN EDGE OF A RIGID STRUCTURE

(71) Applicant: Albert D. Massi, Las Vegas, NV (US)

(72) Inventor: Albert D. Massi, Las Vegas, NV (US)

(*) Notice: Subject to any disclaimer, the term of this patent is extended or adjusted under 35 U.S.C. 154(b) by 214 days.

(21) Appl. No.: 17/396,548

(22) Filed: Aug. 6, 2021

(65) Prior Publication Data
US 2022/0048461 A1 Feb. 17, 2022

Related U.S. Application Data

(60) Provisional application No. 63/064,332, filed on Aug. 11, 2020.

(51) Int. Cl.
| | |
|---|---|
| *B60R 21/34* | (2011.01) |
| *B60R 11/00* | (2006.01) |
| *B60R 21/04* | (2006.01) |
| *B60R 21/055* | (2006.01) |

(52) U.S. Cl.
CPC ............ *B60R 21/34* (2013.01); *B60R 21/04* (2013.01); *B60R 21/055* (2013.01); *B60R 2011/004* (2013.01); *B60R 2011/005* (2013.01); *B60R 2021/0442* (2013.01); *B60R 2021/346* (2013.01)

(58) Field of Classification Search
CPC ............ B60R 21/34; B60R 2011/004; B60R 2011/005; B60R 2021/346; B60R 21/055; B60R 2021/0442; B60R 21/04

USPC ..................................................... 296/187.04
See application file for complete search history.

(56) References Cited

U.S. PATENT DOCUMENTS

| | | | | |
|---|---|---|---|---|
| 5,934,754 A | * | 8/1999 | Raffa ..................... | B60N 2/783 297/392 |
| 2018/0156381 A1 | * | 6/2018 | Gulledge ................. | B60Q 3/74 |

FOREIGN PATENT DOCUMENTS

| | | | | |
|---|---|---|---|---|
| DE | 202017107958 U1 | * | 3/2018 | ............ B29C 43/18 |
| DE | 102018110588 A1 | * | 11/2019 | |

* cited by examiner

*Primary Examiner* — Amy R Weisberg
*Assistant Examiner* — Dana D Ivey
(74) *Attorney, Agent, or Firm* — LOZA & LOZA, LLP; David S. Sarisky

(57) ABSTRACT

A cushion apparatus for attachment to a rigid structure having an edge includes an elongated structure and a securing mechanism. The elongated structure is formed of a soft material and has a channel/slot/groove along its length that is configured to receive a portion of the rigid structure that includes the edge. The securing mechanism is configured to secure the elongated structure to the rigid structure. The securing mechanism may be integrated with the elongated structure and configured to removably secure the elongated structure to the rigid structure.

4 Claims, 5 Drawing Sheets

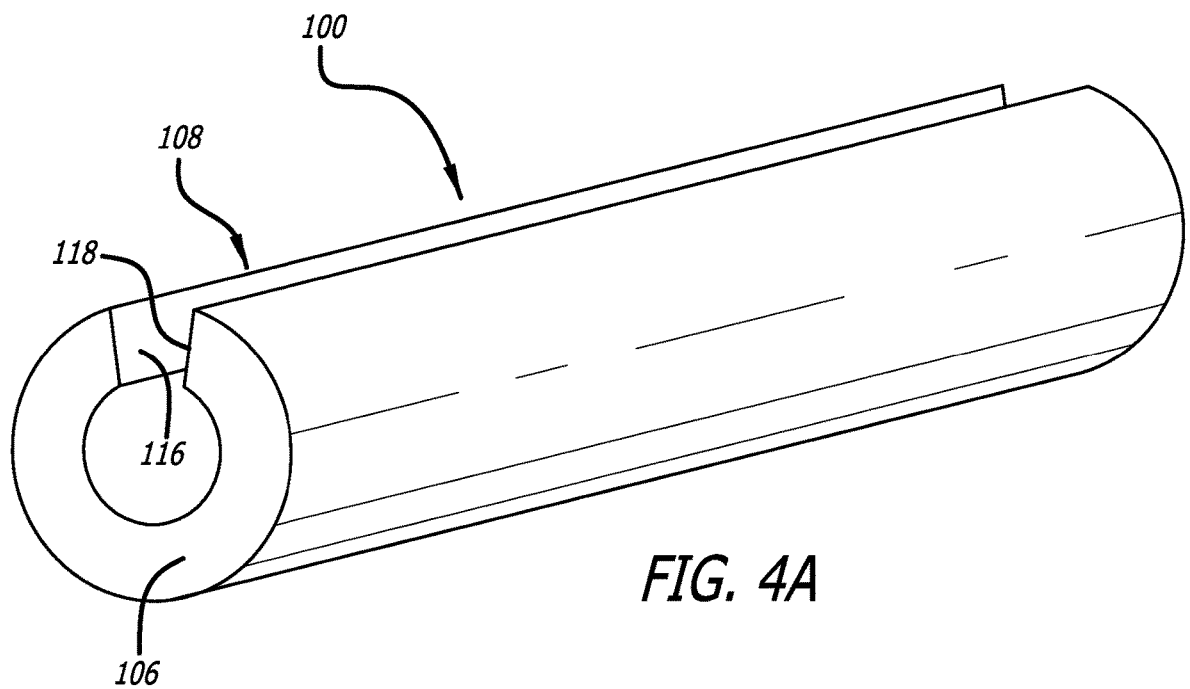
FIG. 4A
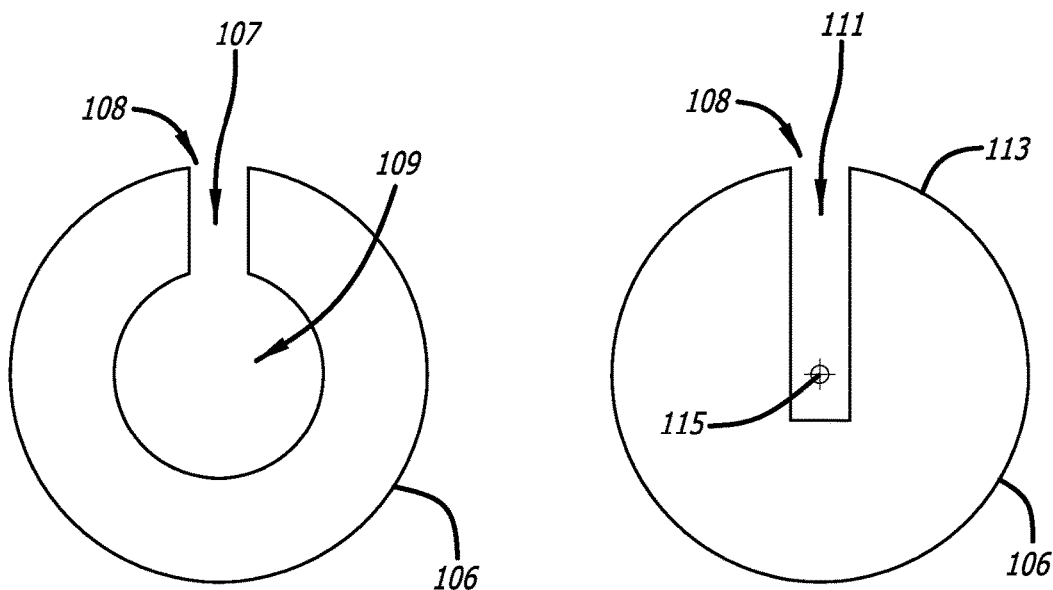
FIG. 4B  FIG. 4C

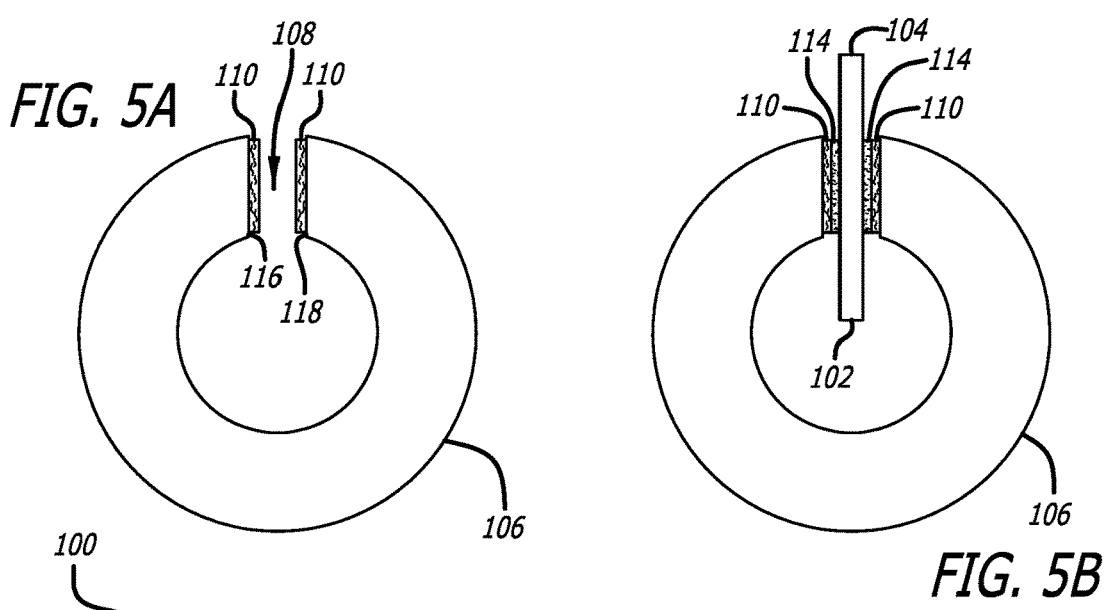
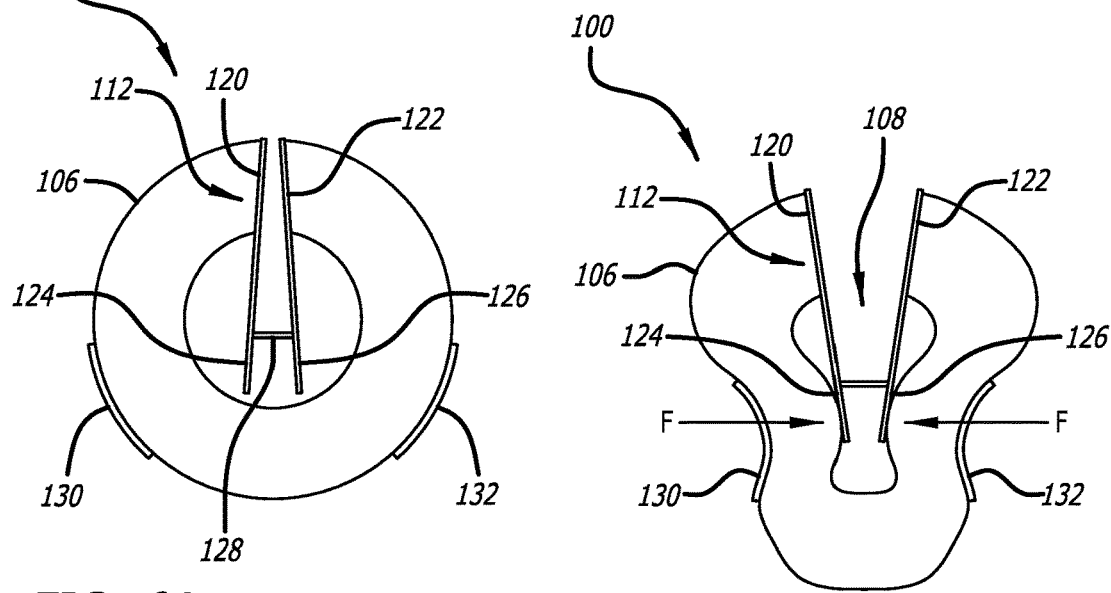
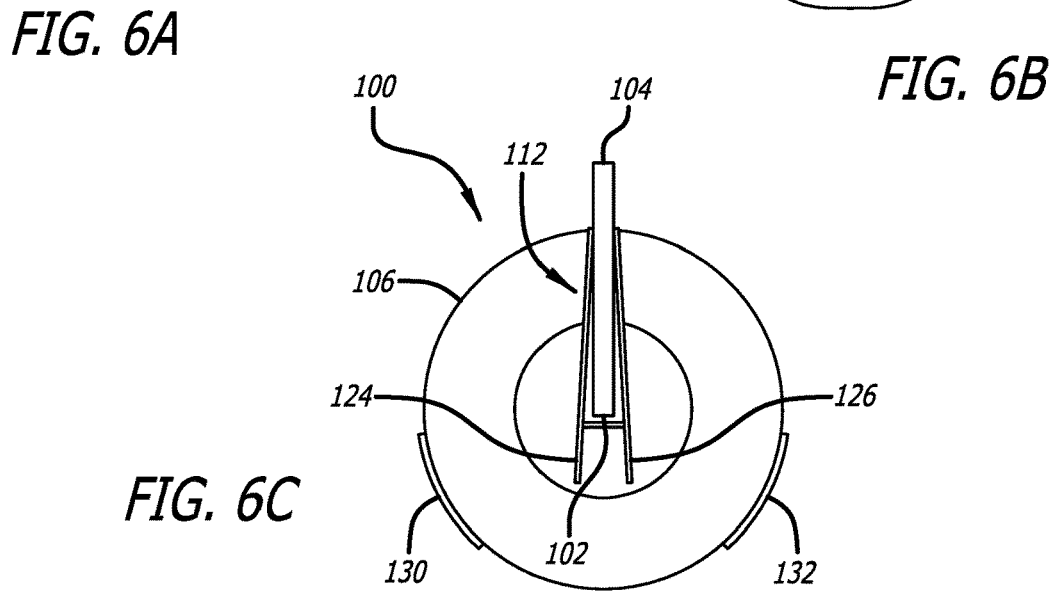

APPARATUS FOR COVERING AN EDGE OF A RIGID STRUCTURE

CROSS-REFERENCE TO RELATED APPLICATION(S)

This application claims the benefit of and priority to U.S. Provisional Patent Application Ser. No. 63/064,332, filed Aug. 11, 2020, for "Apparatus for Covering an Edge of a Rigid Structure", the entire disclosure of which is incorporated herein by reference.

TECHNICAL FIELD

The present disclosure relates generally to an apparatus for attachment to a rigid structure having a narrow or pointed edge, and more particularly, to a cushion apparatus for attachment to a hard-top canopy of a vehicle, such as a golf cart, to cover the narrow or pointed edge of the canopy.

BACKGROUND

Edges of rigid structures may cause injury and pain to users of such structures. For example, vehicles like golf carts have rigid hard-top canopies with narrow or pointed edges against which a person may hit his head when either entering or exiting the golf cart.

It is therefore desirable to provide a cushion apparatus that may be attached to the rigid structures like golf cart canopies to cover the edges and protect against injury. It is further desirable that the cushion apparatus be portable in nature so that it can be easily attached to the rigid structure when needed and detached therefrom after use. The concepts disclosed below address these needs and others.

SUMMARY

In one aspect of the disclosure, a cushion apparatus for attachment to a rigid structure having an edge includes an elongated structure and a securing mechanism. The elongated structure is formed of a soft material and has a channel/slot/groove along its length that is configured to receive a portion of the rigid structure that includes the edge. The securing mechanism is configured to secure the elongated structure to the rigid structure. The securing mechanism may be integrated with the elongated structure and configured to removably secure the elongated structure to the rigid structure.

It is understood that other aspects of apparatuses and methods will become readily apparent to those skilled in the art from the following detailed description, wherein various aspects of apparatuses and methods are shown and described by way of illustration.

BRIEF DESCRIPTION OF THE DRAWINGS

Various aspects of apparatuses will now be presented in the detailed description by way of example, and not by way of limitation, with reference to the accompanying drawings, wherein:

FIG. 4A is an isometric illustration of an elongated structure of a cushion apparatus.

FIG. 4B is a cross-section illustration of the elongated structure of FIG. 4A.

FIG. 4C is a cross-section illustration of another embodiment of an elongated structure.

FIG. 5A is a cross-section illustration of a first embodiment of a cushion apparatus including the elongated structure of FIG. 4A and having a touch-fastener structure for securing the apparatus to a hard-top canopy.

FIG. 5B is a cross-section illustration of the cushion apparatus of FIG. 5A attached to a touch-fastener structure of the hard-top canopy.

FIG. 6A is a cross-section illustration of a second embodiment of a cushion apparatus shown in its normally closed position and including the elongated structure of FIG. 4A a biasing mechanism for securing the apparatus to a hard-top canopy.

FIG. 6B is a cross-section illustration of the cushion apparatus of FIG. 6A shown in its opened position.

FIG. 6C is a cross-section illustration of the cushion apparatus of FIG. 6A in its normally closed position and attached to a hard-top canopy.

DETAILED DESCRIPTION

Figure 1:
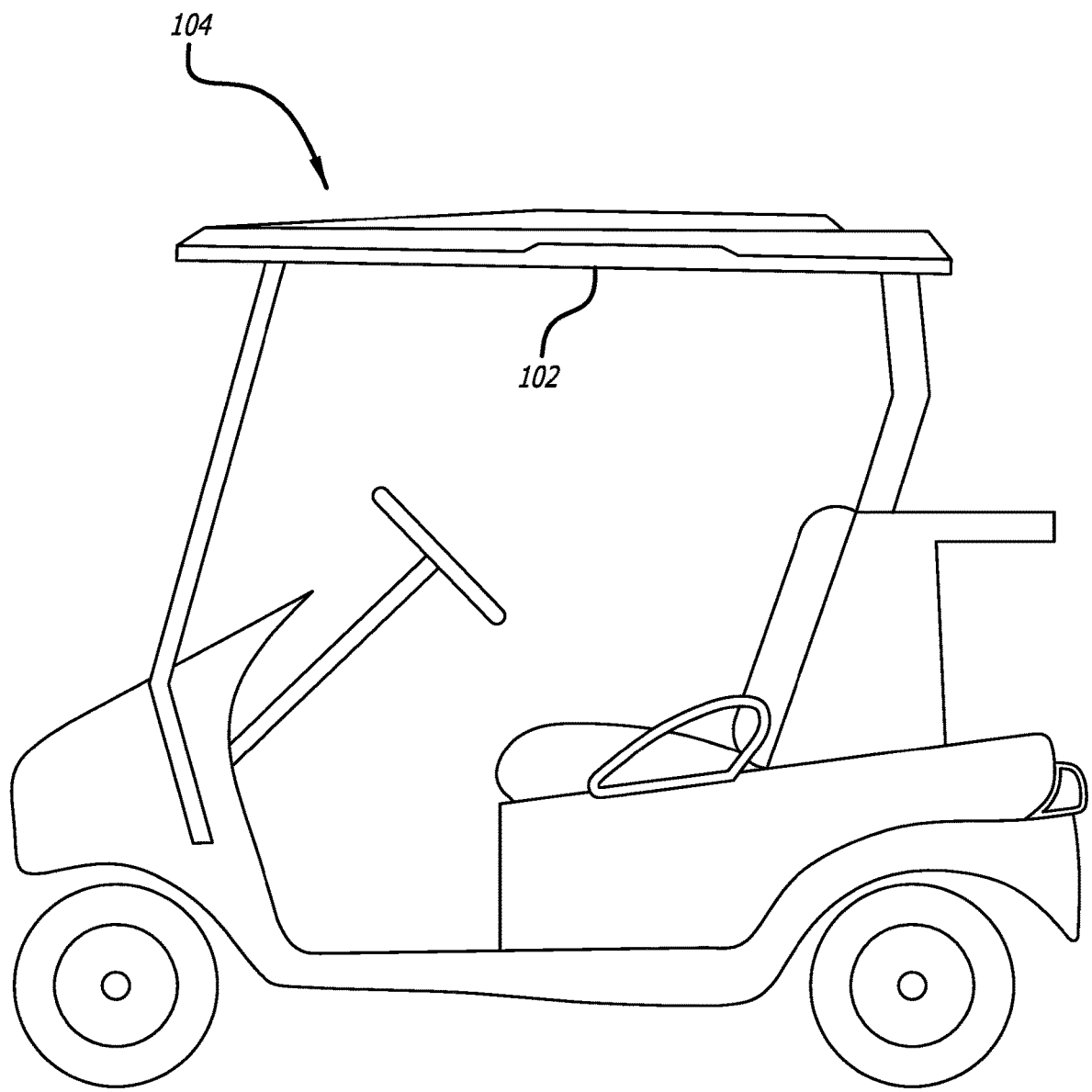
FIG. 1 is an illustration of a vehicle, e.g., a golf cart, having a rigid hard-top canopy with a narrow or pointed edge.
Figure 2:
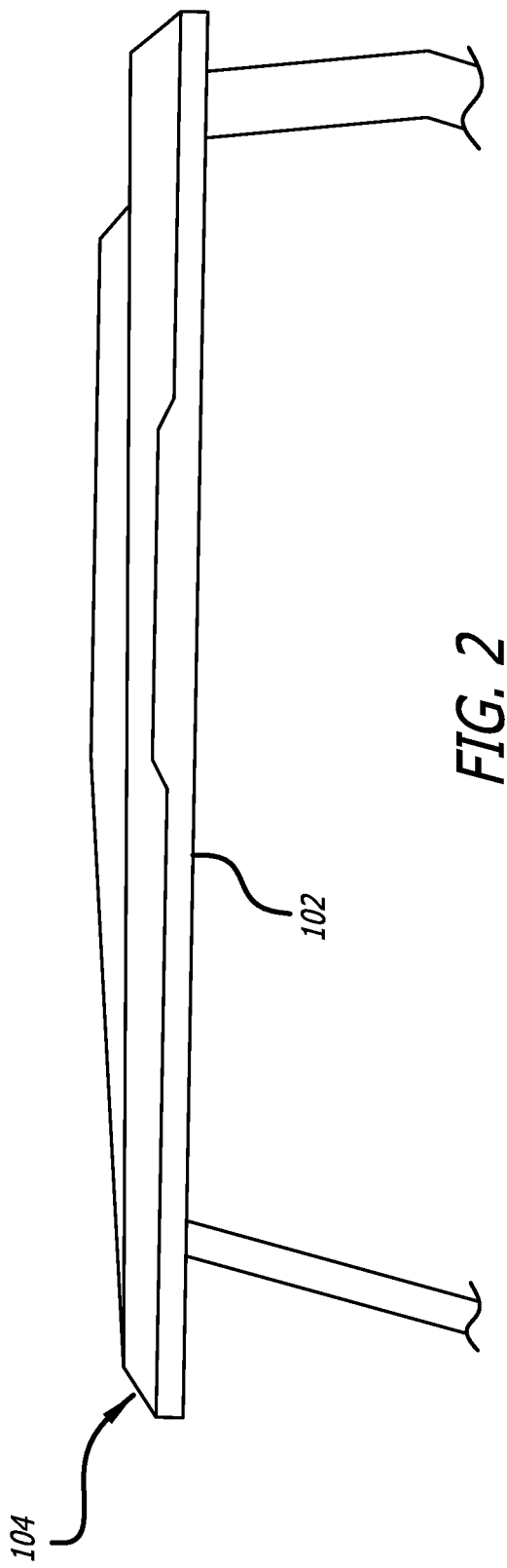
FIG. 2 is a close-up illustration of the rigid hard-top canopy of FIG. 1.
Figure 3:
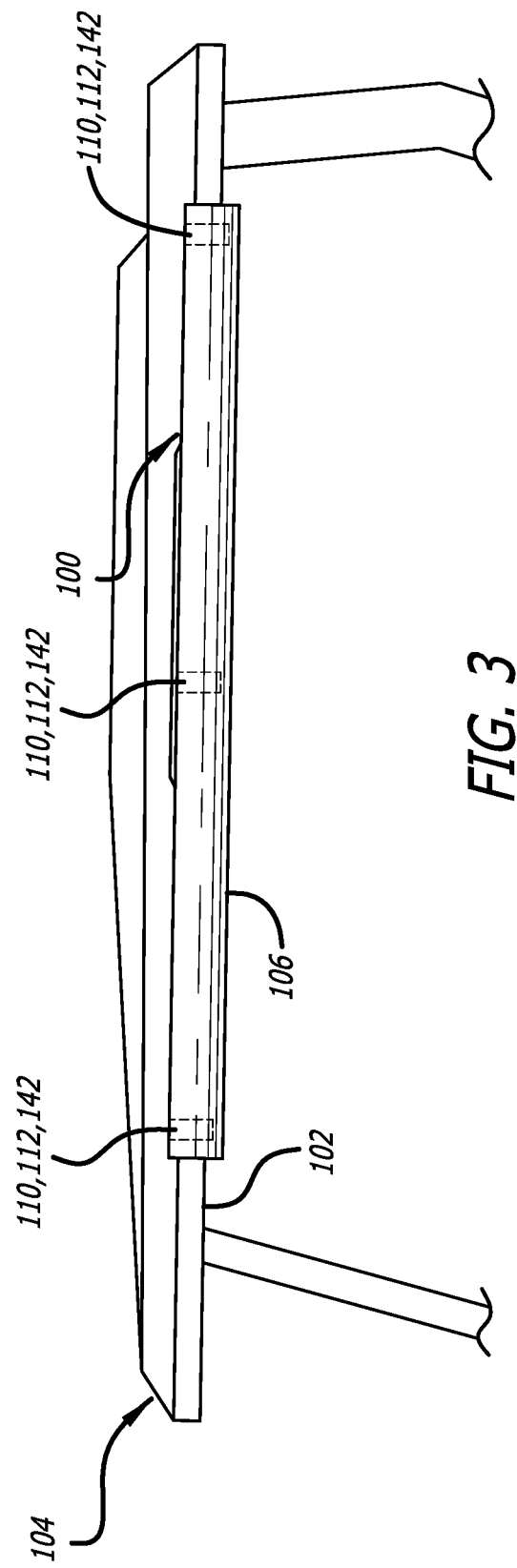
FIG. 3 is an illustration of a cushion apparatus attached to the rigid, hard-top canopy of FIG. 2 to cover the narrow or pointed edge.

Disclosed herein is an cushion apparatus for attachment to rigid structures having edges that may be characterized as narrow, thin, or pointed, and that may cause pain or injury when directly contacted by a person. With reference to FIGS. 1 and 2, the rigid structure 104 may be, for example, a hard-top canopy of a golf cart and the edge 102 may correspond to the perimeter of the canopy.

With reference to FIGS. 3-7B, the cushion apparatus 100 includes an elongated structure 106 formed of a soft material and a securing mechanism 110, 112, 114, 142 configured to secure the elongated structure 106 to the rigid structure 104 to cover the edge 102. The elongated structure 106 shown in FIGS. 4A-4C and other figures throughout, has a circular cross section. The elongated structure 106 may, however, have other cross section shapes. For example, the elongated structure 106 may have a rectangular cross-section. The soft material may be a plastic foam (e.g. polyethylene foam). The elongated structure 106 may be any color, and in one embodiment is a noticeable, contrasting "warning" color relative to the rigid structure. For example, the elongated structure 106 may be formed of a red or yellow foam.

With reference to FIGS. 4A-4C, the elongated structure 106 has a channel/slot/groove 108 along its length that is configured to receive a portion of the rigid structure 104 to cover the edge 102. While the channel/slot/groove 108 of the elongated structure 106 shown in FIGS. 4A and 4B, and some of the other figures throughout, transitions from a rectangular cross-section 107 to a circular cross-section 109, the channel/slot/groove may take a variety of other shapes. For example, with reference to FIG. 4C, the channel/slot/ groove 108 may be a simple, rectangular cross-sectioned slot 111 that extends from the exterior surface 113 of the body of the elongated structure 106 toward the center 115 of the structure.

In some embodiments, the securing mechanism is configured to permanently secure the elongated structure 106 to the rigid structure 104. To this end, and with reference to FIG. 4A, the elongated structure 106 has a first surface 116 on a first side of a channel/slot/groove 108 facing a second surface 118 on a second side of the channel/slot/groove, and the securing mechanism may be an adhesive (not shown) applied to one or both of the first surface and the second surface.

In other embodiments, the securing mechanism 110, 112 is configured to removably secure the elongated structure 106 to the rigid structure 104. To this end, with reference to FIGS. 5A and 5B, in one configuration of a removable cushion apparatus 100, the securing mechanism 110 comprises a first touch-fastener structure configured to engage and secure to a corresponding second touch-fastener structure 114 associated with the rigid structure 104. The first touch-fastener structure 110 may be a single piece that extends along the length of the elongated structure 106 or it may include a number of separate touch-fastener segments spaced apart along the length of the elongated structure. For example, the touch-fastener segments may be located at just the ends of the elongated structure 106, or perhaps at the ends and the center. The first and second touch-fastener structures may be Velcro™ touch fasteners.

As shown in FIGS. 4A and 5A, the elongated structure 106 has a first surface 116 on a first side of the channel/slot/groove 108 facing a second surface 118 on a second side of the channel/slot/groove, and the first touch-fastener structure 110 is associated with at least one of the first surface 116 and the second surface 118. With reference to FIG. 5B, in this configuration, the rigid structure 104, e.g., hard-top canopy of a golf cart, has an top surface (that is visible from the exterior of the cart) and an underneath surface (that is visible from the interior of the cart), and a second touch-fastener structure 114 is associated with each surface. In other configurations, the second touch-fastener structure 114 may be associated with only one of the top surface or bottom surface of the rigid structure 104.

In this configuration, the cushion apparatus 100 is secured to the rigid structure 104 by sliding the edge 102 of the rigid structure 104 into the channel/slot/groove 108 and mating the first touch-fastener structure 110 of the cushion apparatus 100 with the second touch-fastener structure 114 of the rigid structure 104. To remove the cushion apparatus 100 from the rigid structure 104, the mated first touch-fastener structure 110 of the apparatus and second touch-fastener structure 114 of the rigid structure 104 are separated and the elongated structure 106 is pulled away and separated from the rigid structure.

With continued reference to FIG. 5A, in another configuration, the securing mechanism 110 may be a re-adherable strip of glue. The re-adherable strip of glue 110 may be a single piece that extends along the length of the elongated structure 106 or it may include a number of separate glue segments spaced apart along the length of the elongated structure. The re-adherable strip of glue 110 is configured to temporarily secure the elongated structure 106 to the surface of the rigid structure 104. To this end, the re-adherable strip of glue 110 comprises a pressure-sensitive adhesive that allows the elongated structure 106 to be easily attached to the surface of the rigid structure 104, removed from the surface of the rigid structure without leaving residue on the structure, and later re-attached to another rigid structure.

The re-adherable strip of glue 110 is like a Post-it Note adhesive, but of a stronger nature to allow for secure adhesion to a rigid structure 104 like a golf-cart canopy and to withstand outdoor environments and movements. In this configuration, the rigid structure 104 does not require a complementary structure that interacts with the re-adherable strip of glue 110. For example, unlike the touch-fastener strip configuration, which requires the rigid structure 104 to have a complementary touch-fastener strip, in this configuration, the re-adherable strip of glue 110 simply sticks to the existing surface of the rigid structure 104.

With reference to FIGS. 6A, 6B, and 6C, in another configuration of a removable cushion apparatus 100, the securing mechanism 112 comprises at least one biasing mechanism (which may be structurally similar to a paper clamp) that is integrated with the elongated structure 106. In one embodiment, several biasing mechanisms 112 are integrated with the elongated structure 106, and spaced apart along the length of the elongated structure. For example, the biasing mechanisms may be located at just the ends of the elongated structure 106, or perhaps at the ends and the center.

The biasing mechanism 112 includes a strip of spring material (metal) having a first arm 120 associated with the first surface 116 of the elongated structure 106, and a second arm 122 associated with the second surface 118 of the elongated structure, and a base 128 connecting the first arm and the second arm. The strip is configured to transition between a normally-closed state (FIG. 6A) caused by a tension in the base 128 that maintains the first arm 120 and the second arm 122 close together or in abutting contact, and an opened state (FIG. 6B) where the tension caused by the base is acted against by external forces to place the first arm 120 and the second arm 122 apart by a distance or space sized to receive the portion of the rigid structure 104 with the edge 102.

The biasing mechanism 112 further includes extensions 124, 126 arranged relative to the arms 120, 122 and the base 128 that enable an application of force F (see FIG. 6B) against the tension that maintains the strip in the normally-closed state to thereby transition the biasing mechanism to the opened state.

The cushion apparatus 100 may also include a plurality of markers 130, 132 associated with opposite sides of the elongated structure 106. These markers 130, 132 are longitudinally aligned with the arms 120, 122 of the biasing mechanism 112 to thereby server as reference points at which a user may apply the force F to transition the biasing mechanism to the opened state. In some configurations, the markers 130, 132 are additional structures, e.g., circular pads, adhered to the surface of the elongated structure 106. In other configurations, the markers 130, 132 may be integrated with the elongated structure 106 and may correspond to, for example, dimples formed in the structure or to geometric shapes, e.g., circles, of a color different than the rest of the structure.

In this configuration, the cushion apparatus 100 is secured to the rigid structure 104 by applying a necessary force F to transition the cushion apparatus 100 to an opened state (as shown in FIG. 6B), and then sliding the elongated structure 106 over the portion of the rigid structure 104 that includes the edge 102. The force F is then removed to transition the cushion apparatus 100 to an closed state (as shown in FIG. 6C), during which the cushion apparatus is secured to the rigid structure 104 by the tension of the biasing mechanism 112. In the case where the cushion apparatus 100 includes a number of biasing mechanisms 112 along its length, this process is repeated for each spring mechanism. To remove the cushion apparatus 100 from the rigid structure 104, each biasing mechanism 112 is transitioned to its opened state and the elongated structure 106 near that opened spring mechanism is pulled away and separated from the rigid structure 104.

Figure 7A:
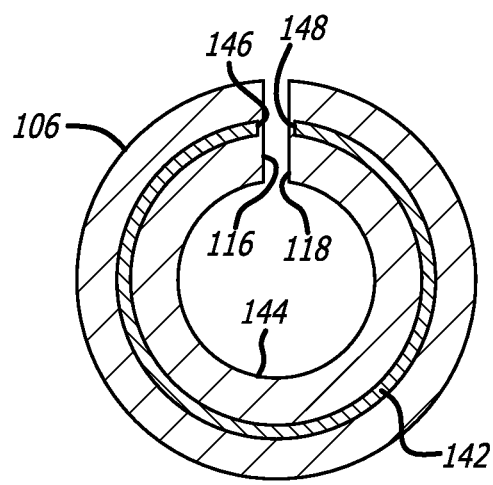
FIG. 7A is a cross-section illustration of a third embodiment of a cushion apparatus shown in its normally closed position and including the elongated structure of FIG. 4A and a biasing mechanism for securing the apparatus to a hard-top canopy.
Figure 7B:
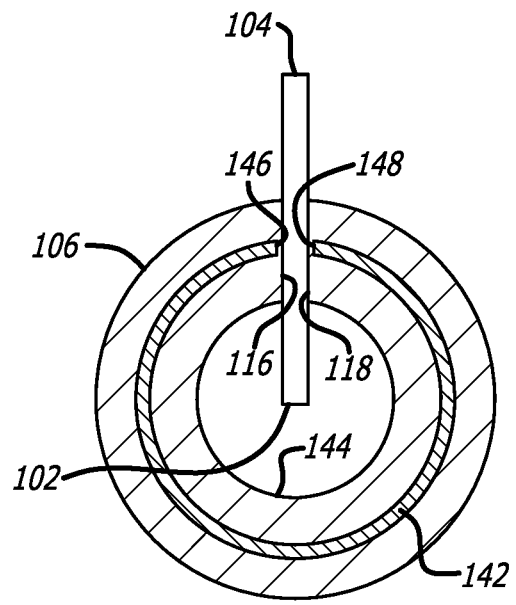
FIG. 7B is a cross-section illustration of the cushion apparatus of FIG. 7A shown in in its normally closed position after having been attached to a hard-top canopy.

With reference to FIGS. 7A and 7B, in another configuration, the securing mechanism may be a biasing mechanism 142 that when viewed from its side, has a shape that corresponds to the cross-sectional shape of the elongated structure 106. For example, a biasing mechanism 142 may be C-shaped from the side to match the C-shaped cross-section of the elongated structure 106 shown in FIG. 7A. The biasing mechanism 142 is integrated into the elongated structure 106. For example, the biasing mechanism 142 may be embedded into the foam material of the elongated structure 106, or it may be secured to the inner wall 144 of the elongated structure. The biasing mechanism 142 is formed of a spring-loaded, shape-memory material that biases the ends 146, 148 of its C shape toward each other, which in turn, biases the opposed surfaces 116, 118 of the elongated structure 106 toward each other, to a normally closed state like that shown in FIG. 7A. Note that in FIG. 7A for clarity of illustration a gap is shown between the opposed surfaces 116, 118 of the elongated structure 106, while in the normally closed state these opposed surfaces may be forced into abutting contact by the biasing mechanism 142.

In this configuration, the cushion apparatus 100 is secured to the rigid structure 104 by placing the edge 102 of the rigid structure at or into the narrow gap between the opposed surfaces 116, 118 of the elongated structure 106 and applying a necessary push force to overcome the biasing force of the biasing mechanism 142 and slide the elongated structure 106 over the portion of the rigid structure 104. Once this is done, the push force is removed and the biasing mechanism 142 biases the ends 146, 148 of its C shape toward each other, and in turn, the opposed surfaces 116, 118 of the elongated structure 106 together, to create a force against the surface of the rigid structure 104 sufficient to secure the cushion apparatus 100 in place on the structure like that shown in FIG. 7B. To remove the cushion apparatus 100 from the rigid structure 104, the elongated structure 106 is pulled away with sufficient force to slid it off of the rigid structure against the gripping force of the biasing mechanism 142.

The various aspects of this disclosure are provided to enable one of ordinary skill in the art to practice the present invention. Various modifications to exemplary embodiments presented throughout this disclosure will be readily apparent to those skilled in the art. Thus, the claims are not intended to be limited to the various aspects of this disclosure, but are to be accorded the full scope consistent with the language of the claims. All structural and functional equivalents to the various components of the exemplary embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

What is claimed is:

1. An apparatus for attachment to a rigid structure having an edge, the apparatus comprising:
   an elongated structure formed of a soft material, and having a channel/slot/groove along its length configured to receive a portion of the rigid structure that includes the edge; and
   a securing mechanism configured to secure the elongated structure to the rigid structures wherein:
      the securing mechanism is configured to removably secure the elongated structure to the rigid structure, and comprises at least one biasing mechanism integrated with the elongated structure,
      the elongated structure comprises a first surface on a first side of the channel/slot/groove facing a second surface on a second side of the channel/slot/groove,
      the at least one biasing mechanism comprises a strip of spring material formed to include: a first arm associated with the first surface of the elongated structure, a second arm associated with the second surface of the elongated structure, and a base connecting the first arm and the second arm,
      the strip of spring material is configured to transition between a normally-closed state caused by a tension in the base that maintains the first arm and the second arm close together or in abutting contact, and an opened state where the tension caused by the base is acted against to place the first arm and the second arm apart by a space or distance sized to receive the portion of the rigid structure, and
      the at least one biasing mechanism further comprises a first extension arranged relative to the first arm and the base, and a second extension arranged relative to the second arm and the base, and the first and second arms enable an application of a force F against the tension that maintains the at least one biasing mechanism in the normally-closed state to thereby transition the at least one biasing mechanism to the opened state.

2. The apparatus of claim 1, wherein the securing mechanism comprises a plurality of biasing mechanisms spaced apart along the length of the elongated structure.

3. The apparatus of claim 1, further comprising a plurality of markers associated with opposite sides of the elongated structure and aligned with the first and second arms of the at least one biasing mechanism to thereby provide reference points at which to apply the force F to transition the at least one biasing mechanism to the opened state.

4. The apparatus of claim 1, wherein the soft material is made of a plastic foam.

* * * * *